Oct. 24, 1944.　　O. B. FETTERMAN　　2,361,016

BLACK-OUT SHIELD FOR VEHICLE HEADLIGHTS

Filed Oct. 31, 1942　　2 Sheets-Sheet 1

INVENTOR.
Oscar B. Fetterman
BY
Robert L. Dennison
ATTORNEY

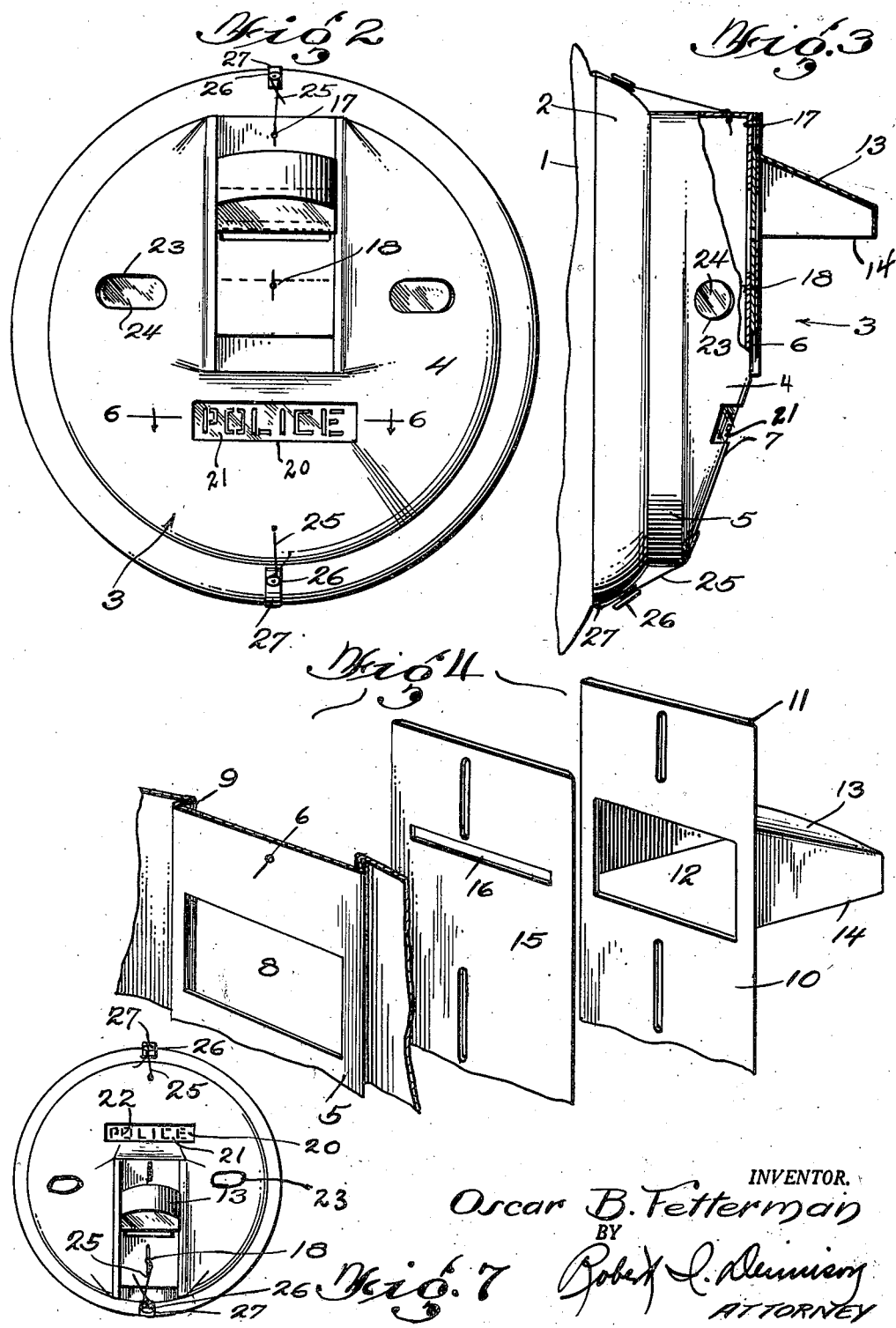

Patented Oct. 24, 1944

2,361,016

UNITED STATES PATENT OFFICE 2,361,016

BLACK-OUT SHIELD FOR VEHICLE HEADLIGHTS

Oscar B. Fetterman, Washington, D. C.

Application October 31, 1942, Serial No. 464,071

5 Claims. (Cl. 240—48.4)

The present invention relates to improvements in accessories for lamps and has reference more particularly to a black-out shield for use on vehicle headlights during a black-out.

The present application comprises an improvement upon the black-out shield for vehicle headlights disclosed in my prior Patent No. 2,350,676 issued June 6, 1944.

The primary object of the invention is to provide a black-out shield for use on vehicle headlights which will control the projection of the rays of light emanating from the light source in the headlight.

One of the main objects of the invention is to provide a black-out shield that includes a hood adapted to be secured in position over the lens of a vehicle headlight, with the front of the hood being provided with an opening through which the beam of light from the light source within the headlight is emitted, means being associated with said opening for regulating the projection of the beam of light therethrough.

A further object resides in the provision of an improved light shielding unit for the black-out shield, wherein the entire unit is mounted for adjustment on the exterior of the hood, thus facilitating the ready and easy assembly and adjustment of said unit on the hood.

A still further object is to provide a black-out shield wherein the light emitted from the headlight may be either in the form of a narrow framed beam, a diffused or dimmed wide beam or a clear beam.

Another object is to provide a black-out shield that is entirely constructed of non-critical materials.

A further object is to provide a black-out shield for vehicle headlights that can be used on any type of vehicle headlight and further capable of adjustment to accommodate any beam of light projected from the light source in the headlight.

A further object is to provide a black-out shield embodying a light shielding unit that, after having been initially adjusted to the beam of light, may be secured in such adjusted position as to insure the proper control of the projection of the beam of light when the black-out shield is attached to the headlight for use.

Other objects and advantages will become apparent from the following description and accompanying drawings.

In the accompanying drawings forming a part of this specification and in which like numerals designate corresponding parts throughout the several views:

Figure 2 is a front elevation thereof;

Figure 3 is a side elevation, with parts of the light shielding unit shown in section;

Figure 4 is a composite view in perspective of the parts comprising the light shielding unit;

Figure 7 is a view showing the black-out shield reversed so that the light shielding unit is located at the bottom for use in conjunction with a headlight whose light source is located in the bottom portion of the headlight casing.

Figure 1:
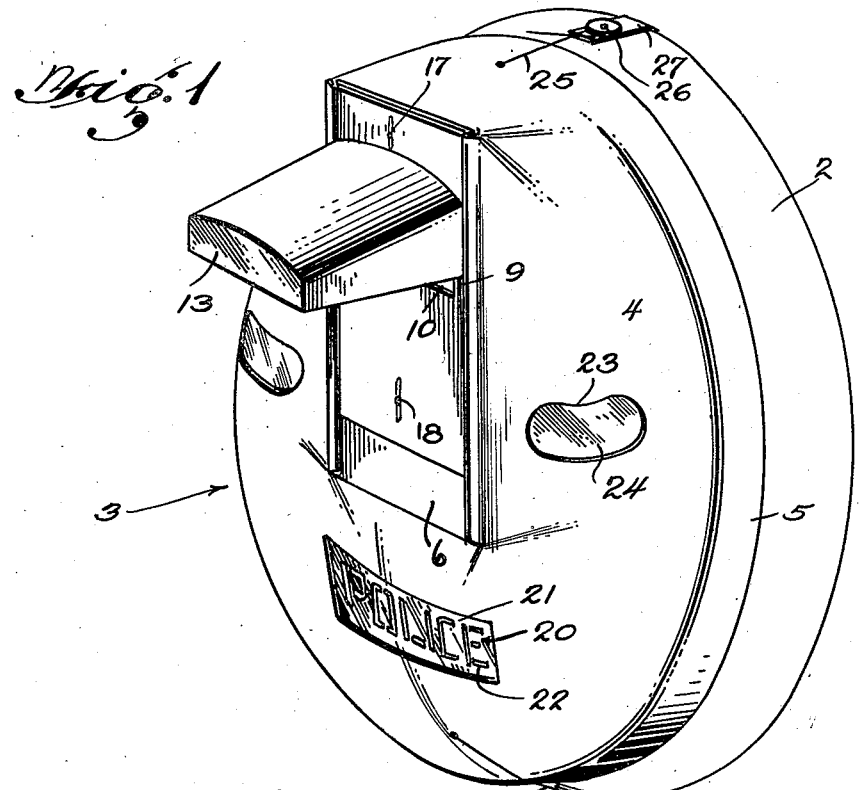
Figure 1 is a perspective view of my improved black-out shield showing the same mounted on a vehicle headlight of the sealed beam type.
Figure 5:
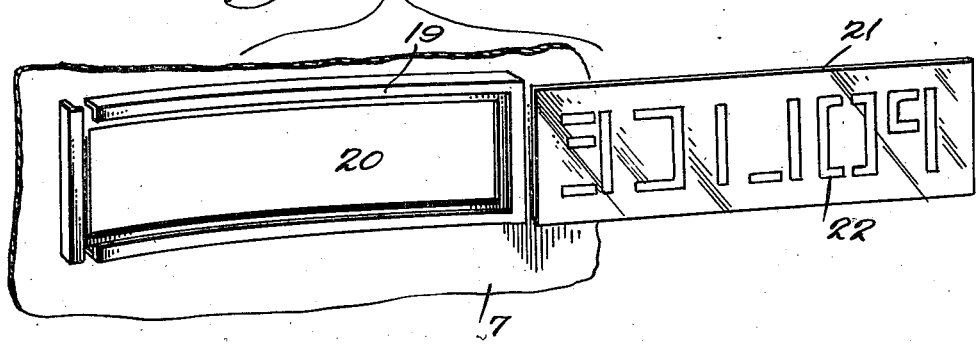
Figure 5 is a composite view of the identification slide and mount associated with the black-out shield.
Figure 6:
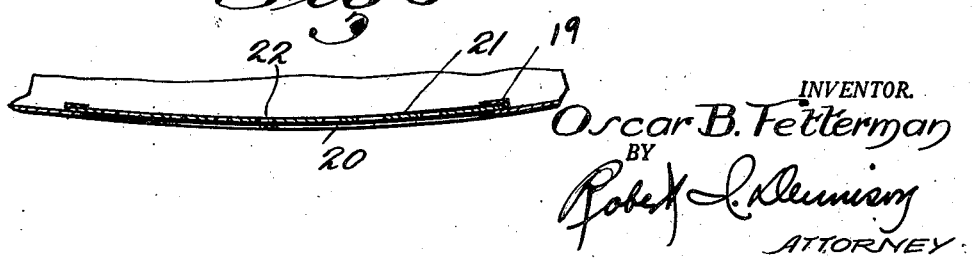
Figure 6 is a sectional view taken approximately on the line 6—6 of Figure 2.

In the drawings, the numeral 1 designates the headlight casing or housing which has mounted at its front the usual lens, the retaining ring for the latter being shown at 2. It is, of course, understood that the usual light source and reflector is arranged within the headlight housing.

My improved black-out shield is preferably formed of non-critical material such as plastics, although I do not wish to limit myself to the particular material that may be used.

The shield denoted generally by the numeral 3 comprises an opaque hood 4. The open rear side of the hood is formed with an annular flange 5 that is adapted to be disposed around the lens frame and the retaining ring 2 for the latter. The hood is secured in place over the front of the lens by the cords 25 carried by the hood at the top and bottom thereof and which cords coact with the respective buttons 26 carried by the exposed free end portions of the fiber tabs 27. These tabs are bent to engage around the rear edge of the lens retaining ring 3. The securing means for the black-out shield has been disclosed and described in detail in my aforesaid co-pending application.

The upper front portion of the hood is enlarged and the front face of this enlarged portion is flat. This flattened front wall 6 extends to a point below the center of the hood. The portion of the hood below the flat front wall 6 is inclined rearwardly toward the bottom as indicated at 7, so that no reflecting surface is provided in the lower portion of the hood.

An enlarged aperture 8 is formed in the central portion of the flat front wall portion 5 through which the light rays from the light source in the headlight casings are emitted. This aperture is located so as to be in direct line with the beam of light emanating from the light source.

Vertically extending guides 9 are provided on the exterior face of the hood at opposite sides of the flat front wall portion 6 and these guides extend for the full length of the flat front wall portion. These guides may be formed in any suitable manner on the hood. In the present instance, the guides are formed by setting the flat front wall portion slightly inwardly and the guides are further dove-tailed in cross section.

The light shielding unit comprising a salient part of the instant invention comprises a plate-like member 10 that is mounted for slidable movement over the outer face of the flat front wall portion 6, the side edges of this member being beveled as indicated at 11 for cooperation with the guides 9.

The plate-like member 10 is formed with a light emitting aperture 12 for cooperation with the light emitting aperture 8 formed in the front wall of the hood, in the manner to be presently described.

Carried by the upper portion of this plate-like member and extending forwardly therefrom is the peaked portion or visor 13. The bottom of this visor is open and the lower edge 14 extends across the intermediate portion of the light emitting aperture 12 as clearly illustrated in the drawings. The plate-like member and the visor carried thereby are preferably molded from plastic material and constitute a unitary structure. The top of the visor may be slightly curved and is further spaced from the upper edge of the plate-like member 10. The top of the visor also slopes slightly toward its outer forward end. The outer end of the visor projects sufficiently from the hood so as to effectively preclude the light rays emitted from the headlight from projecting upwardly and the rays will be caused to be projected downwardly and at the same time shielded from view from above.

Also forming a part of the light shielding unit is the panel 15 that is adapted to be interposed between the apertured front wall 6 and the plate-like member and this panel is mounted for vertical adjustment in the guides 9, the side edges of the panel being beveled for this purpose.

This panel is also formed of plastic, although it may be formed of fiber, metal or any other desirable material. A narrow light emitting slit 16 is formed transversely in this panel for cooperation with the apertures 8 and 12, respectively.

In assembling the light shielding unit on the hood, the panel 15 and the visor carrying plate-like member 10 are positioned between the guides 9 against the outer face of the flat front wall 6. The movable units are then vertically adjusted while on the hood to position the slit 16 in proper focus with the beam of light projected. After this unit has been so adjusted, the same is secured in such position by suitable fastening means illustrated at 17 and 18 that pass through the front wall 6, the panel 15 and the plate-like member 10.

The hood is provided with suitable identification tag supporting means. In the present instance, the indicia designates "Police." However, any other identifying indicia may be employed, such as "Fire Department," "Doctor," "Warden," etc., depending on the use of the vehicle equipped with my black-out shield. The identifying indicia is rendered interchangeable, and to this end, suitable guides 19 are arranged around the opening 20 formed in the lower portion 7 of the hood to slidably and removably receive the indicia carrying tag or plate 21. This tag or plate has the identifying indicia 22 cut out therefrom and red colored Cellophane covers the inner face of this cut out indicia.

Side openings 23 of oval shape are formed in the hood so that drivers of vehicles or persons approaching the vehicle equipped with the black-out shield from the side may readily distinguish the vehicle. These openings are also covered on their inner faces with red colored Cellophane strips 24 that may be adhesively secured to the inner face of the hood.

When the device is to be used during a black-out or darkness, the user merely places the hood and the previously adjusted light shielding unit carried thereby over the lens of the headlight and the flange 5 of the hood will fit between the lens clamping ring 2 and the lens retaining frame. The cords 25 are then tied around the top and bottom buttons 26 and thereby the device is securely held in place and properly positioned on the headlight.

With the black-out shield attached to the headlight, the beam of light that is projected from the light source in the headlight will pass through the registering apertures 8, 16 and 12 and will be deflected downward onto the ground in front of the vehicle by the light shielding visor 13.

Thus, the operator of a vehicle equipped with my improved black-out shield can safely travel in the dark with sufficient vision ahead. At the same time, the actual light source will not be visible to persons or drivers of approaching vehicles in front of the vehicle. No light can be seen from the horizontal plane of the beam, or from any angle above the horizontal plane.

By employing a diffuser element in association with the light shielding unit, a diffused light will be projected, and when it is desired to obtain a clear unobstructed beam of light for use in driving under certain conditions, the light shielding unit may be removed in its entirety.

If desired, the panel 15 with its narrow transverse slit 16 may be eliminated and in lieu thereof, a modified plate-like member having a narrow transverse slit formed therein, similar to the slit 16 in the panel 15 instead of the large aperture 12, may be used in conjunction with the light shielding visor 13.

The mounting of the light shielding unit on the exterior of the hood permits the same to be readily and easily adjusted for regulating the projection of the beam of light through the various registering apertures.

Where the light source is located in the lower portion of the headlight, my black-out shield may be used thereon by merely reversing the position of the shield and mounting the light shielding unit over the aperture in the flat front wall of the hood in the manner as clearly illustrated in Figure 7 of the drawings.

It will thus be seen from the foregoing description that I have provided an improved black-out shield for vehicle headlights that can be used in conjunction with headlights of the sealed beam type, as well as all other types of headlights and by mounting the light shielding unit on the exterior of the hood, access thereto may be readily and easily had for making all necessary adjustments.

Due to its simplicity, my device can be manufactured and sold very inexpensively and the use of critical materials is obviated. The black-out shield will be strong and durable and at all times positive and efficient in carrying out the purposes for which it has been designed.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. In combination with a vehicle headlight having a reflector housing adapted to enclose a light source therein and a lens at the forward end of the housing; a hood mounted in front of the lens, said hood having an aperture in its front face through which a beam of light from said light source is emitted, guides arranged vertically at opposite sides of said aperture, a plate-like member mounted for slidable movement over the outer face of the apertured front wall of the hood between said guides, said plate-like member having a light emitting aperture formed therein for registry with the aforementioned aperture, and a forwardly projecting visor carried by the plate-like member and arranged above the aperture therein for causing the projected beam of light to be directed downwardly.

2. In combination with a vehicle headlight having a reflector housing adapted to enclose a light source therein and a lens at the forward end of the housing; a hood mounted in front of the lens, said hood having an aperture in its front face through which a beam of light from said light source is emitted, guides arranged vertically at opposite sides of said aperture, a plate-like member mounted for slidable movement over the outer face of the apertured front wall of the hood between said guides, said plate-like member having a light emitting aperture formed therein for registry with the aforementioned aperture, a forwardly projecting visor carried by the plate-like member and arranged above the aperture therein for causing the projected beam of light to be directed downwardly, and a panel having a narrow transverse light emitting slit mounted behind the plate-like member and slidable between the guides on the front wall of the hood.

3. In combination with a vehicle headlight having a reflector housing adapted to enclose a light source therein and a lens at the forward end of the housing; a hood mounted in front of the lens, said hood having an aperture in its front face through which a beam of light from said light source is emitted, guides arranged vertically at opposite sides of said aperture, a plate-like member mounted for slidable movement over the outer face of the apertured front wall of the hood between said guides, said plate-like member having a light emitting aperture formed therein for registry with the aforementioned aperture, a forwardly projecting visor carried by the plate-like member and arranged above the aperture therein for causing the projected beam of light to be directed downwardly, and a panel having a narrow transverse light emitting slit mounted behind the plate-like member and slidable between the guides on the front wall of the hood, said plate-like member and panel being capable of independent slidable movement.

4. In combination with a vehicle headlight having a reflector housing adapted to enclose a light source therein and a lens at the forward end of the housing; a hood mounted in front of the lens, the upper front portion of the hood being enlarged and the front face of the enlarged portion being flat, the portion of the hood below the flat front face being inclined rearwardly, said flat front face having an aperture therein through which a beam of light from said light source is emitted, guides arranged vertically on the flat front face at opposite sides of the aperture, a plate-like member mounted for slidable movement over the outer face of the apertured front face between said guides, said plate-like member having a light-emitting aperture, a forwardly projecting visor carried by the plate-like member and arranged above the aperture therein for causing the projected beam of light to be directed downwardly, and a panel having a narrow transverse light-emitting slit mounted between the plate-like member and the apertured flat front face and slidable between the guides on the flat front face of the enlarged portion of the hood.

5. In combination with a vehicle headlight having a reflector housing adapted to enclose a light source therein and a lens at the forward end of the housing; a hood mounted in front of the lens, said hood having an aperture in its front face through which a beam of light from said light source is emitted, guides arranged vertically at opposite sides of said aperture, a plate-like member mounted for slidable movement over the outer face of the apertured front wall of the hood between said guides, said plate-like member having a light emitting aperture formed therein for registry with the aforementioned aperture, a forwardly projecting visor carried by the plate-like member and arranged above the aperture therein for causing the projected beam of light to be directed downwardly, a panel having a narrow transverse light emitting slit mounted behind the plate-like member and slidable between the guides on the front wall of the hood, said plate-like member and the panel being provided with registering slots above and below the aperture and slit respectively, the flat front face of the hood being formed with openings with which the aforesaid slots register, and fastening means extending through the registering slots and openings for securing the plate-like member and the panel in their adjusted positions.

OSCAR B. FETTERMAN.